US005164207A

United States Patent [19]

Durina

[11] Patent Number: 5,164,207

[45] Date of Patent: Nov. 17, 1992

[54] PLASTIC EXTRUDER WITH AUTOMATIC SHUT-OFF VALVE

[75] Inventor: Michael F. Durina, Poland, Ohio

[73] Assignee: Spirex Corporation, Youngstown, Ohio

[21] Appl. No.: 789,305

[22] Filed: Nov. 8, 1991

[51] Int. Cl.[5] .............................................. A29C 47/00

[52] U.S. Cl. ................................ 425/382.4; 425/564; 425/DIG. 225; B29C/47/00

[58] Field of Search ...................... 425/382.4, 564, 562, 425/DIG. 224, DIG. 225

[56] References Cited

U.S. PATENT DOCUMENTS

| | | | |
|---|---|---|---|
| 2,940,123 | 6/1960 | Beck et al. | 425/564 |
| 3,002,229 | 10/1961 | Friederich . | |
| 3,335,461 | 8/1967 | Schwartz . | |
| 3,401,426 | 9/1968 | Evans . | |
| 3,438,393 | 4/1969 | Godley, II | 137/533 |
| 3,590,439 | 7/1971 | Swanson . | |
| 3,813,014 | 5/1974 | Guerin | 222/413 |
| 3,871,805 | 3/1975 | Jacobs | 425/DIG. 225 |
| 4,427,361 | 1/1984 | Saito | 425/564 |
| 4,512,733 | 4/1985 | Eichlseder et al. | 425/207 |
| 4,530,605 | 7/1985 | Eichlseder et al. | 425/382.4 |
| 4,681,528 | 7/1987 | Maruyama et al. | 425/564 |
| 4,850,851 | 7/1989 | Dinerman | 425/562 |
| 4,966,539 | 10/1990 | Pena | 425/208 |
| 5,002,717 | 3/1991 | Taniguchi | 425/208 |

FOREIGN PATENT DOCUMENTS

| | | | |
|---|---|---|---|
| 1201039 | 9/1965 | Fed. Rep. of Germany . | |
| 2155623 | 5/1973 | Fed. Rep. of Germany | 425/DIG. 224 |

*Primary Examiner*—David A. Simmons
*Assistant Examiner*—William J. Matney, Jr.
*Attorney, Agent, or Firm*—Buchanan Ingersoll

[57] ABSTRACT

A plastic extruder having a rotating helical screw within a cylindrical shell. An automatic shut-off valve is mounted at the forward end of the helical screw. The valve includes a unitary or integral valve body and a poppet which is axially movable and is rotatable relative to the valve body. A rearwardly extending axial bore is provided at the forward end of the screw and the valve body extends into and is secured to the screw within said bore. The poppet has an axial stem which extends through the valve body into the axial bore. A compression spring is mounted on the rearward end of the poppet stem to act cooperatively with respect to the poppet to urge the poppet against a seating surface of the valve body and maintain the valve in a normally closed position. Flow of plastic through the valve upon rotation of the screw causes the valve to open. However, the valve automtically closes upon cessation of screw rotation to prevent back-flow of plastic during the injection step.

5 Claims, 1 Drawing Sheet

PLASTIC EXTRUDER WITH AUTOMATIC SHUT-OFF VALVE

BACKGROUND OF THE INVENTION

This invention relates to a plastic extruder and more particularly this invention relates to an automatic shut-off valve for controlling flow of molten plastic through a plastic extruder.

SUMMARY OF THE INVENTION

The plastic extruder of this invention comprises a rotating helical screw within a cylindrical shell of the type which is used to feed molten plastic to a high pressure injection molding apparatus. The plastic extruder and the injection molding apparatus operate sequentially. First, the plastic extruder, by rotation of the helical screw, forces molten plastic through the injection molding apparatus. As the molten resin is pumped through the valve of this invention, volume is displaced within the cylinder which forces the helical screw to retract. When the screw is retracted to a pre-set position, screw rotation is stopped. The screw and valve apparatus are then ready for the next step in the injection molding process which is the injection of the molten resin into the awaiting mold. At this point, the pressures are much higher than during the extrusion step.

The valve of the present invention is located near to discharge port of the extruder. The valve is normally closed but is forced open during the extrusion step to allow molten plastic to flow from the extruder to the injection molder. The valve automatically closes following the extrusion step to prevent back-flow of plastic through the extruder during the high pressure injection molding operation.

The automatic shut-off valve is mounted at the forward end of the helical screw. The valve comprises a unitary or integral valve body all of which is axially stationary relative to the screw and a poppet which is axially movable relative to the screw. The clearance between facing surfaces of the valve body and the poppet is adjustable by axial movement of the poppet and this clearance comprises the valve opening.

The outside diameter of the valve body is in close proximity to the inside wall of the cylinder, allowing rotation and retraction of the valve body relative to the cylinder but preventing plastic from by-passing the valve. Openings are provided in the valve body to allow passage of molten plastic through the valve. The continuance or interruption of flow of molten plastic through the extruder is determined by the opening or closing of the valve, which is determined by movement of the poppet towards or away from the valve body.

The core of the helical screw is provided with an axial bore at its forward end. A rearward projection of the valve body is secured within the axial bore so that the entire valve body is integral with, moves axially with and rotates with the helical screw. The movable poppet has a rearwardly extending axial stem which extends through a longitudinal bore in the valve body and thence into said axial bore. A compression spring is mounted around the rear of the axial stem out of contact with the molten plastic in the extruder to operate cooperatively with respect to the poppet whereby the spring tends to maintain the poppet in a retracted position so that the facing surface of the poppet and the valve seat on the valve body are normally in contact with each other, whereby the valve is normally closed.

Rotation of the helix during the extrusion step and resultant flow of molten plastic in a forward direction creates a pressure in the valve which pushes against the compression of the spring and opens the valve. However, when the rotation of the helix stops so that the injection molding step can proceed, the valve closes automatically under the action of the spring to prevent back flow of molten plastic due to the forward movement of the screw and valve.

BRIEF DESCRIPTION OF THE DRAWINGS

The invention will be more clearly understood by reference to the attached drawings in which.

DESCRIPTION OF THE PREFERRED EMBODIMENTS

Figure 1:
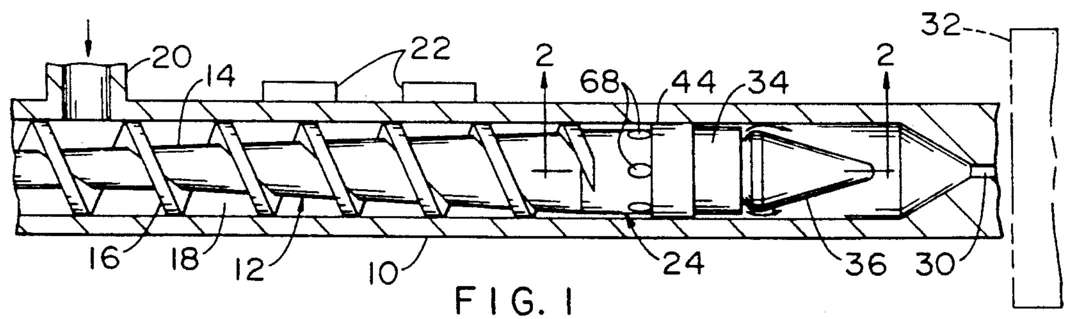
FIG. 1 is a cross-sectional view of an extruder injection apparatus of this invention including the automatic shut-off valve.

FIG. 1 presents a cross-sectional view of an extruder injection apparatus of this invention. The injection apparatus includes a cylinder 10 enclosing a rotating screw 12. Screw 12 comprises core 14 around which helical flight 16 is coiled to define channel sections 18. Plastic pellets are fed to the rear of the injection apparatus through inlet port 20 and the apparatus is heated by heaters 22 so that the pellets become melted during transit within cylinder 10. This operation and apparatus is described more fully in U.S. Pat. No. 4,752,136.

Figure 2:
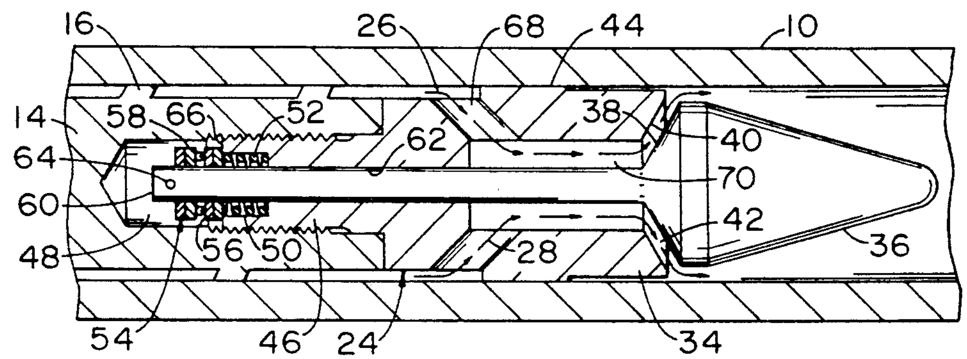
FIG. 2 is a partial cross-sectional view taken through section 2—2 of FIG. 1 showing the valve in the open position.
Figure 3:
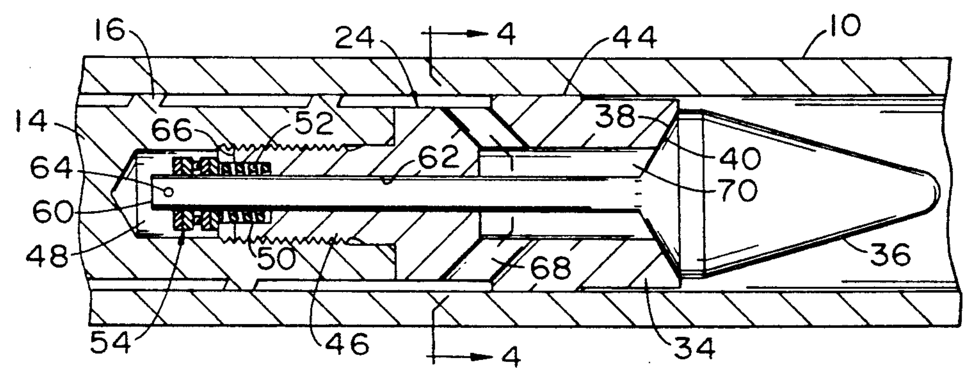
FIG. 3 is a partial cross-sectional view taken through section 2—2 of FIG. 1 showing the valve in the closed position.

The automatic-shut non-return valve of the invention is located at the forward end of rotating screw 12 and is indicated generally at 24 in FIG. 1. A cross-sectional view of the valve taken through section 2—2 of FIG. 1 is shown in FIGS. 2 and 3. The non-return valve is shown in the open position in FIG. 2 with molten plastic flow through the valve indicated by flow lines 26 and 28, which represent regions of a common annular flow stream. The molten plastic stream discharges from cylinder 10 through forward discharge port 30 and passes to a conventional high pressure injection mold apparatus indicated schematically at 32. The auto-shut valve is shown in the closed position in FIG. 3. The valve is in the closed position during the high pressure injection mold step.

The auto-shut valve comprises body 34 and valve poppet 36 which is axially movable relative to stationary body 34. Poppet 36 has a frusto-conical valve face defined as tapered surface 38 which faces a complementary frusto-conical valve seat defined as tapered surface 40 on body 34. When valve face 38 and valve seat 40 are separated, as shown in FIG. 2, the valve is open as indicated by annular channel 42 which allows the flow of annular plastic stream 26, 28. When surfaces 38 and 40 abut against each other, as shown in FIG. 3, channel 42 disappears and the valve is shut so that plastic flow is prevented. Cylindrical collar 44 of valve body 34 is in close proximity to cylinder 10 so that molten plastic exiting from helical screw 12 cannot by-pass valve 24, whereby the path through channel 42 is the only path for molten plastic to reach discharge opening 30.

Valve body 34 is provided with rearwardly extending axial projection 46 having outer threads. Core 14 of screw 12 is provided at its forward end with complementary rearwardly extending axial bore 48 having internal threads for receiving rearwardly extending projection 46 in threaded engagement therewith, with the rearwardmost portion of the bore 48 remaining unoccupied by projection 46. The rearward end of projection 46 is provided with forwardly extending bore or recess 50 containing coiled spring 52. Spring 52 is maintained under compression by means of thrust ball bearing 54 having forward race 56 and rearward race 58 which is wedged between coil 50 and retainer pin 64. Any other retainer, such as a nut, can be used in place of pin 64.

Poppet 36 is provided with rearwardly extending rod-like axial stem 60 which extends through and in fluid tight engagement with longitudinal axial bore 62 in valve projection 46. Spring 52 and bearing 54 are mounted around the rearward end of stem 60 and are retained on stem 60 by means of pin 64 which extends through stem 60. Pin 64 forces forward race 56 of thrust bearing 54 to abut against rearward end abutment surface 66 of projection 46 when the valve is in the extreme open position shown in FIG. 2 but spring 52 forces bearing 54 away from abutment surface 66 when the valve is in the closed position shown in FIG. 3 where frusto-conical surfaces 38 and 40 abut against each other.

Figure 4:
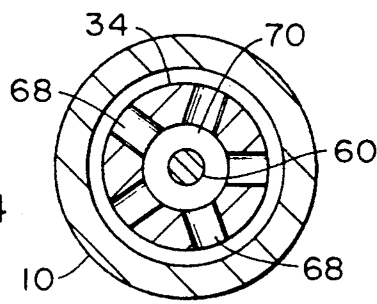
FIG. 4 is a cross-sectional view of the valve taken through the section 4—4 of FIG. 3.

FIG. 4 is a cross-sectional view of section 4—4 of FIG. 3 and shows inwardly directed passageways 68 in stationary body 34 providing access to annular channel 70 which in turn leads to annular channel 42, thereby providing the flow path for molten plastic indicated by dashed lines 26 and 28 shown in FIG. 2.

The apparatus operates as follows. Plastic pellets are passed to cylinder 10 through inlet port 20 and rotation of screw 12 forces the pellets forwardly in cylinder 10. During transit, the pellets become molten due to the heat input from heaters 22 and through frictional heat. The stream of molten plastic flows forwardly in valley or channel sections 18 of screw 12 until reaching collar 44 whereat the stream is forced inwardly through openings 68 to passageway 70, as indicated by dashed lines 26 and 28. Spring 52 normally holds poppet 36 in a retracted position, as shown in FIG. 3, wherein surfaces 38 and 40 abut against each other so that passageway 42 disappears. However, the pressure of molten plastic generated by rotating screw 12 forces poppet 36 forwardly against the tension in spring 52.

The forward movement of poppet 36 due to the pressure of plastic flow causes movable surface 38 of poppet 36 to be separated from stationary seating surface 40 to define passageway 42, as shown in FIG. 2, so that molten plastic can pass outwardly and fill the cavity area in front of the screw/valve assembly. As soon as the screw has retracted to a preset position the rotation of the screw ceases. Instantaneously, the fluid (polymer) pressure starts to equalize within the cylinder and the spring forces the poppet to retract allowing surfaces 38 and 40 to abut and form a seal. The seal remains in effect during the injection step.

FIG. 2 shows that during the extrusion step the forward axial motion of poppet 36 is limited by the abutment of thrust bearing 54 against surface 66. as shown in FIG. 2. During the time that the plastic is flowing forwardly through the valve, poppet 36 is forced open as shown in FIG. 2. The load compresses spring 52 so that thrust bearing 54 abuts against surface 66 and pin 64. The tendency is for poppet 36 to rotate at a rate independent of screw 12. Valve 34 and the thrust bearing 54 allows poppet 34 to rotate freely and without any surfaces abrading one another.

It is a feature of this invention that spring 52 and thrust bearing 54 are secluded and protected from contact with flowing plastic. This protection is accomplished by maintaining all contact surfaces between core 14 and rearward projection 46 fluid tight and also by maintaining the contact surfaces between rod 60 and rearward projection 46 fluid tight. Thereby, molten plastic cannot reach bore 48 or recess 50 containing bearing 54 and spring 66, respectively. It should be noted that the functioning of the device is such that the interface between longitudinal bore 62 and rod 60 is not subject to the high pressures existing at orifice 30 during the injection cycle because the valve is closed during that process stage. It is subject only to the somewhat lower pressures involved in the extrusion portion of the cycle.

Pressures in front of the valve during the injection stage can be up to 60 times greater than pressures in the cylinder during the extrusion stage. Because the valve of this invention is closed during the injection stage, the valve constitutes an important barrier protecting the interface between longitudinal bore 62 and rod 60 against subjection to the high plastic pressures in front of the valve during the injection stage. Thereby, the valve of this invention provides an important barrier against spring 52 and thrust bearing 54 being subject to leakage of plastic into their compartment.

I claim:

1. In a plastic extruder comprising a rotating helical screw in a heated cylinder, said cylinder having means near its rearward end for feeding plastic pellets and a discharge port at its forward end for discharging molten plastic to an injection molding apparatus, the improvement comprising an automatic shut-off valve in said cylinder, said valve comprising a valve body and a poppet at the forward end of said valve body, said poppet axially movable and rotatable with respect to said valve body, a facing surface on said poppet and a complementary seating surface on said valve body defining a valve opening, said entire valve body secured to the forward end of said helical screw so that said entire valve body rotates integrally with respect to said screw, said valve body in close proximity to the inner surface of said cylinder to prevent molten plastic from by-passing said valve, flow passageway means through said valve body for the passage of molten plastic from said cylinder through said valve body, said flow passageway means including said valve opening, spring means cooperatively positioned with respect to said poppet to urge said poppet towards said valve body to maintain said valve opening in a normally closed position, said spring means positioned in the interior of said valve and out of contact with molten plastic, rotation of said helical screw and flow of molten plastic forcing said poppet away from said valve body to open said valve against the force of said spring.

2. A plastic extruder comprising a rotating helical screw in a heated cylinder, said screw having a core with a helical flight on the surface of said core, means for feeding plastic at the rearward end of said cylinder and discharge port means at the forward end of said cylinder for the discharge of molten plastic, an automatic shut-off valve at the forward end of said helical screw, said valve having a valve body and a poppet at the forward end of said valve body, said poppet axially movable and rotatable relative to said valve body, a facing surface on said poppet and a complementary seating surface on said valve body defining a valve opening, an axial bore in the forward end of said core, said valve body having a rearward projection extending into said axial bore and secured therein so that said entire valve body is integral with and rotates with said helical screw, a rearwardly extending axial stem on said poppet, a longitudinal bore in said valve body, said stem extending through said longitudinal bore into said axial bore, a compression spring mounted around the rear of said stem and out of contact with molten plastic, said spring operating cooperatively with respect to the poppet to maintain the poppet in a normally retracted position so that said facing and seating surfaces are normally in contact with each other and the valve is normally closed, opening means in said valve body for passing molten plastic from said shell into said valve body and towards said poppet, rotation of the screw and flow of molten plastic towards the poppet exerting pressure against the poppet to force the poppet away from the facing surface of the valve body and open the valve.

3. A plasticating apparatus comprising a cylinder enclosing a rotating helical screw, said screw comprising an axial core and a peripheral coiled helical flight, said cylinder having inlet port means at its rearward end for admitting plastic pellets, said cylinder having a discharge port at its forward end for discharging molten plastic to an injection molder, an automatic shut-off valve in said cylinder near said discharge port, said valve automatically opening upon rotation of said screw and forward flow of molten plastic, said valve comprising a cylindrical valve body mounted in close proximity to the interior surface of said cylinder to prevent flow of molten plastic around said valve, a rearwardly extending internally threaded axial bore at the forward end of said core, a rearwardly extending externally threaded axial projection on said valve body, said rearwardly extending axial projection inserted into a portion of said rearwardly extending axial bore and threadedly engaged thereto so that said entire valve body is secured to said helical screw, a forwardly extending axial bore at the rearward end of said rearward projection, a longitudinal axial bore extending through said valve body, a poppet mounted at the forward of said valve body, said poppet axially movable with respect to said screw and rotatable with respect to said screw, said poppet having a conical valve surface facing a complementary conical seating surface at the front end of said valve body, said poppet having an axial stem extending through said longitudinal axial bore into said forwardly extending bore and into said rearwardly extending bore, a compression spring mounted on said valve stem and located in said forwardly extending bore, a thrust bearing mounted on said stem rearwardly of said spring, retaining means on said stem rearwardly of said thrust bearing for retaining said thrust bearing and said spring on said stem, opening means in said valve body open to the plastic flow path in said cylinder, said opening means extending to a flow channel through said valve body to the forward end of said valve, said flow channel including the space between said facing conical surface of said poppet and said conical seating surface of said valve body, said space being normally closed by said compression spring and tending to open under the pressure of molten plastic flowing through said valve.

4. An automatic shut-off valve for a plastic extruder including a helical screw within a cylinder, said valve comprising a unitary valve body secured to said helical screw and a poppet at the forward end of and axially movable with respect to said valve body, a facing surface on said poppet and a complementary seating surface on said valve body defining a valve opening, flow passageway means through said valve body for the passage of molten plastic through said valve body, said flow passageway means including said valve opening, spring means cooperatively positioned with respect to said poppet to urge said poppet towards said valve body to maintain said valve opening in a normally closed position, said spring means positioned at the exterior of said valve and out of contact with molten plastic, flow of molten plastic forcing said poppet away from said valve body to open said valve against the force of said spring, said poppet both axially movable and rotatable with respect to said valve body.

5. An automatic shut-off valve for a plastic extruder, said valve comprising a unitary cylindrical valve body, a rearwardly extending axial projection on said valve body, a forwardly extending axial bore at the rearward end of the rearward projection, a longitudinal axial bore extending through said valve body, a poppet mounted at the forward of said valve body, said poppet being both axially movable and rotatable with respect to said valve body, said poppet having a conical valve surface facing a complementary conical seating surface at the front end of said valve body, said poppet having an axial valve stem extending through said longitudinal axial bore into said forwardly extending bore, a compression spring mounted on said valve stem and located in said forwardly extending bore, a thrust bearing mounted on said stem rearwardly of said spring, retaining means on said stem rearwardly of said thrust bearing for retaining said thrust bearing and said spring on said stem, opening means for receiving molten plastic in said valve body, said opening means extending to a flow channel through said valve body to the forward end of said valve, said flow channel including the space between said facing conical surface of said poppet and said conical seating surface of said valve body, said space being normally closed by said compression spring and tending to open under the force of molten plastic flowing through said valve.

* * * * *